(12) United States Patent
Yarsevich

(10) Patent No.: US 10,239,592 B1
(45) Date of Patent: Mar. 26, 2019

(54) BOAT KEEL GUARD

(71) Applicant: Taylor Made Group, LLC, Gloversville, NY (US)

(72) Inventor: Christopher James Yarsevich, Greenfield Center, NY (US)

(73) Assignee: TAYLOR MADE GROUP, LLC, Gloversville, NY (US)

(*) Notice: Subject to any disclaimer, the term of this patent is extended or adjusted under 35 U.S.C. 154(b) by 0 days.

(21) Appl. No.: 15/801,699

(22) Filed: Nov. 2, 2017

(51) Int. Cl.
| | |
|---|---|
| *B63B 59/02* | (2006.01) |
| *B63B 43/18* | (2006.01) |
| *B32B 3/30* | (2006.01) |
| B32B 27/30 | (2006.01) |
| B32B 7/06 | (2019.01) |
| B32B 7/12 | (2006.01) |

(52) U.S. Cl.
CPC ........... *B63B 43/18* (2013.01); *B32B 3/30* (2013.01); *B32B 7/06* (2013.01); *B32B 7/12* (2013.01); *B32B 27/304* (2013.01); *B32B 2307/412* (2013.01); *B32B 2605/12* (2013.01); *B63B 2221/10* (2013.01)

(58) Field of Classification Search
CPC ....... B63B 43/18; B63B 2221/10; B63B 3/38; B63B 59/02; B63B 59/04; B63B 2003/38; B63B 2059/02; B32B 3/30; B32B 2605/12; B32B 27/304; B32B 7/06; B32B 2307/412; B32B 7/12
USPC .................... 114/84, 140, 219, 343, 361
See application file for complete search history.

(56) References Cited

U.S. PATENT DOCUMENTS

| | | | |
|---|---|---|---|
| 2,352,360 | A * | 6/1944 | Baier .................. B63C 9/02 114/380 |
| 3,055,022 | A | 9/1962 | Vallquist |
| 3,220,026 | A | 11/1965 | Lichti |
| 3,261,320 | A | 7/1966 | Leonard |
| 3,411,304 | A | 11/1968 | Miller |
| 4,751,891 | A | 6/1988 | Wilson |
| 4,762,080 | A | 8/1988 | Pearson |
| 4,803,942 | A | 2/1989 | Dren et al. |
| 4,909,172 | A | 3/1990 | Hamby |
| 4,962,719 | A | 10/1990 | Hughes et al. |
| 5,215,031 | A | 6/1993 | Inman et al. |
| 5,299,521 | A | 4/1994 | Loucks |
| 5,357,890 | A | 10/1994 | Mason, Jr. et al. |
| 5,398,631 | A | 3/1995 | Miller |
| 5,485,801 | A | 1/1996 | Gibbs |
| 5,803,010 | A | 9/1998 | Roy et al. |
| 5,891,551 | A | 4/1999 | Gibbs |
| 5,943,978 | A * | 8/1999 | Garnier .............. B63B 7/082 114/345 |
| 6,148,754 | A * | 11/2000 | Sims, Jr. ............ B63B 59/02 114/219 |

(Continued)

*Primary Examiner* — Daniel V Venne
(74) *Attorney, Agent, or Firm* — Nixon & Vanderhye P.C.

(57) ABSTRACT

A keel guard is comprised of a strip of PVC material having a length and a width. An alignment section is positioned along the length of the strip that is visible through the PVC material. The alignment section, which may be a groove for engaging the keel, facilitates installation and enables the installer to maintain the desired straightness along the entire installed length. Additionally, the see-through PVC material reveals any trapped air bubbles between the keel guard and the hull, enabling the are bubbles to be more easily removed, thereby providing a stronger, more uniform bond.

11 Claims, 3 Drawing Sheets

(56) References Cited

U.S. PATENT DOCUMENTS

2008/0018129 A1* 1/2008 Pelletier .................. B60J 11/06
296/1.08

* cited by examiner

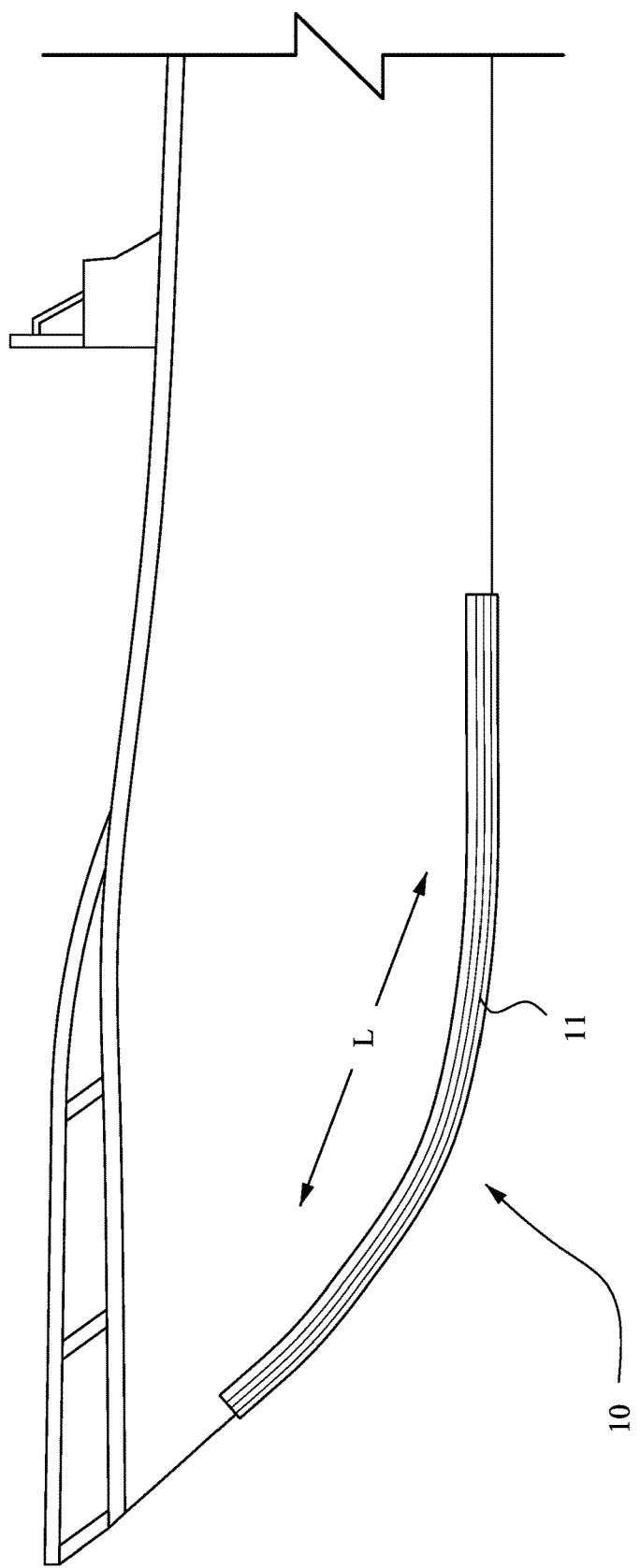

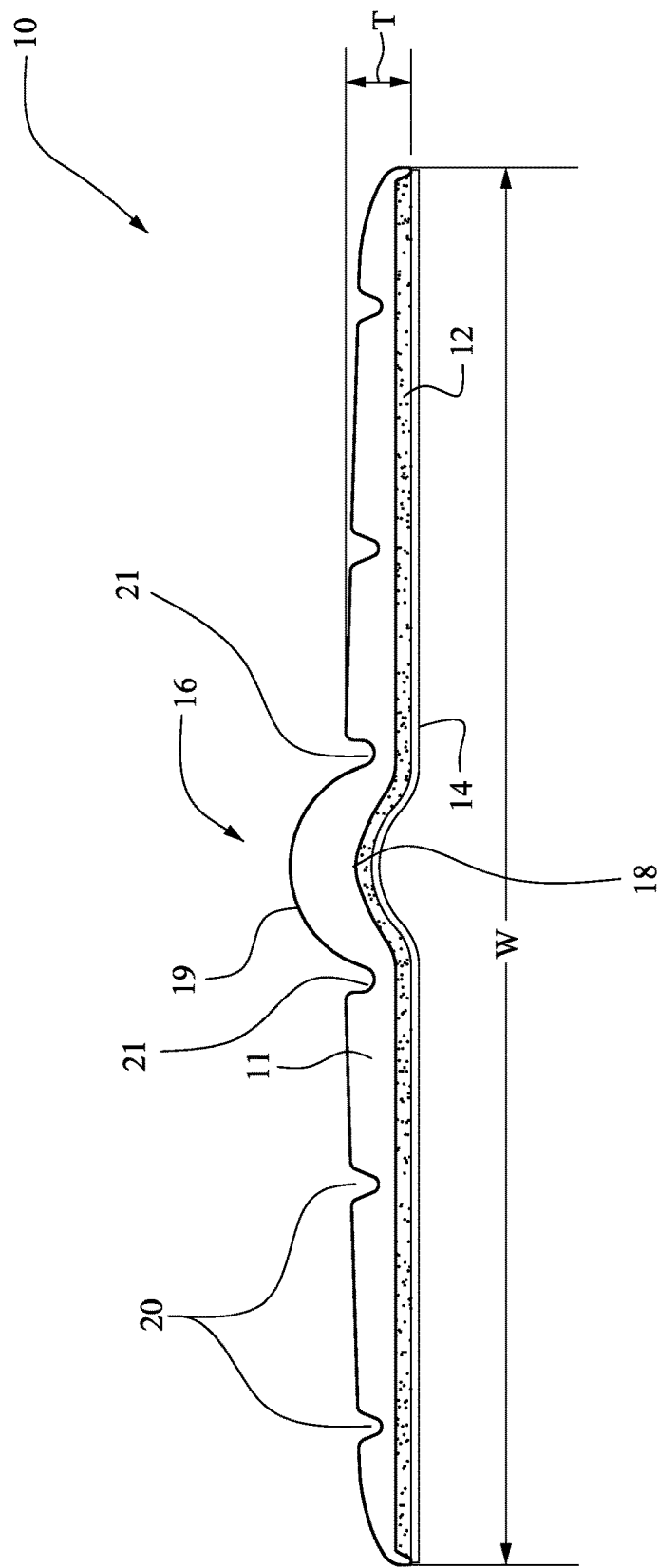

BOAT KEEL GUARD

CROSS-REFERENCES TO RELATED APPLICATIONS (Not Applicable)

STATEMENT REGARDING FEDERALLY SPONSORED RESEARCH OR DEVELOPMENT (Not Applicable)

BACKGROUND

The invention relates to a keel guard for a boat keel and, more particularly, to a keel guard including an alignment feature that is visible through the guard to facilitate installation.

Watercraft are generally formed of a fiberglass, thin metal or composite material which can become easily damaged as a result of impact or collision with sand, gravel, rocks, docks or other objects or debris found in water or on a shoreline. The lowermost portion of the hull of the watercraft (generally encompassing portions of the stem, bow, forefoot, keel and stern) is particularly susceptible to abrasion or damage. Consequently, abrasive damage usually promotes corrosion and structural weakening of the hull in addition to affecting the watercraft appearance.

Traditionally, the keel and hull of a watercraft are formed in a V-shape that facilitates travel in water. As a consequence, however, the keel and hull are susceptible to damage by impact. A keel guard has been used to protect the keel and hull from damage. Existing keel guards, however, are difficult to install. Specifically, it can be problematic to visually line up the product to the centerline of the keel. Additionally, once installed, it can also be difficult to see and remove any trapped air bubbles between the keel guard and the hull.

BRIEF SUMMARY

The keel guard of the described embodiments endeavors to overcome the drawbacks with existing products. The keel guard may include an alignment feature that is visible through the guard to facilitate installation. Additionally, a clear adhesive tape may be applied to the backside of the product such that the product can be applied by properly cleaning and prepping the boat hull, removing the adhesive layer tape liner, and applying the guard to the boat keel. The installer can then work down the length of the keel, one section of the time, applying firm pressure to adhere the guard to the hull.

The ability to see the alignment feature and/or the keel itself through the product makes application much easier. Additionally, it is also possible to see any trapped air bubbles between the guard and the hull, allowing the installer to work them out, thereby creating a stronger, more uniform bond.

In an exemplary embodiment, a keel guard includes a strip of polyvinyl chloride (PVC) material having a length and a width, an adhesive layer on a keel side of the strip, and a removable liner positioned over the adhesive layer. The strip may include an alignment section along the length of the strip that is visible through the PVC material. The alignment section may be an alignment groove formed in the PVC material that is shaped to engage a boat keel. The alignment section may be disposed along a central longitudinal axis of the length of the strip. Flex grooves may also be provided along the length of the strip. In some embodiments, at least two of the flex grooves are provided on opposite sides of the alignment groove. The PVC material may be clear.

In another exemplary embodiment, a guard strip for a boat keel includes a strip of molded or extruded PVC material have a length, a width, and a thickness. The strip of PVC material has an alignment section centrally positioned relative to the width of the strip and extending along the length of the strip. The alignment section may be visible through the strip.

In yet another exemplary embodiment, a method of installing a keel guard onto a boat keel and a boat hull includes the steps of: (a) aligning the strip of PVC material by looking through the strip such that the alignment section is aligned with the boat keel; (b) applying the alignment section to the boat keel; and (c) pressing the keel guard on both sides of the alignment section into engagement with the boat hull. After step (c), the method may additionally include removing air bubbles from between the keel guard and the boat hull by looking through the strip and applying pressure to the strip where the air bubbles are observed. Step (b) may be practiced by engaging the alignment groove with the boat keel.

BRIEF DESCRIPTION OF THE DRAWINGS

These and other aspects and advantages will be described in detail with reference to the accompanying drawings, in which:

FIGS. 1 and 2 show the keel guard installed on a boat keel; and

FIG. 3 is a sectional view of the keel guard across its width.

DETAILED DESCRIPTION

Figure 1:
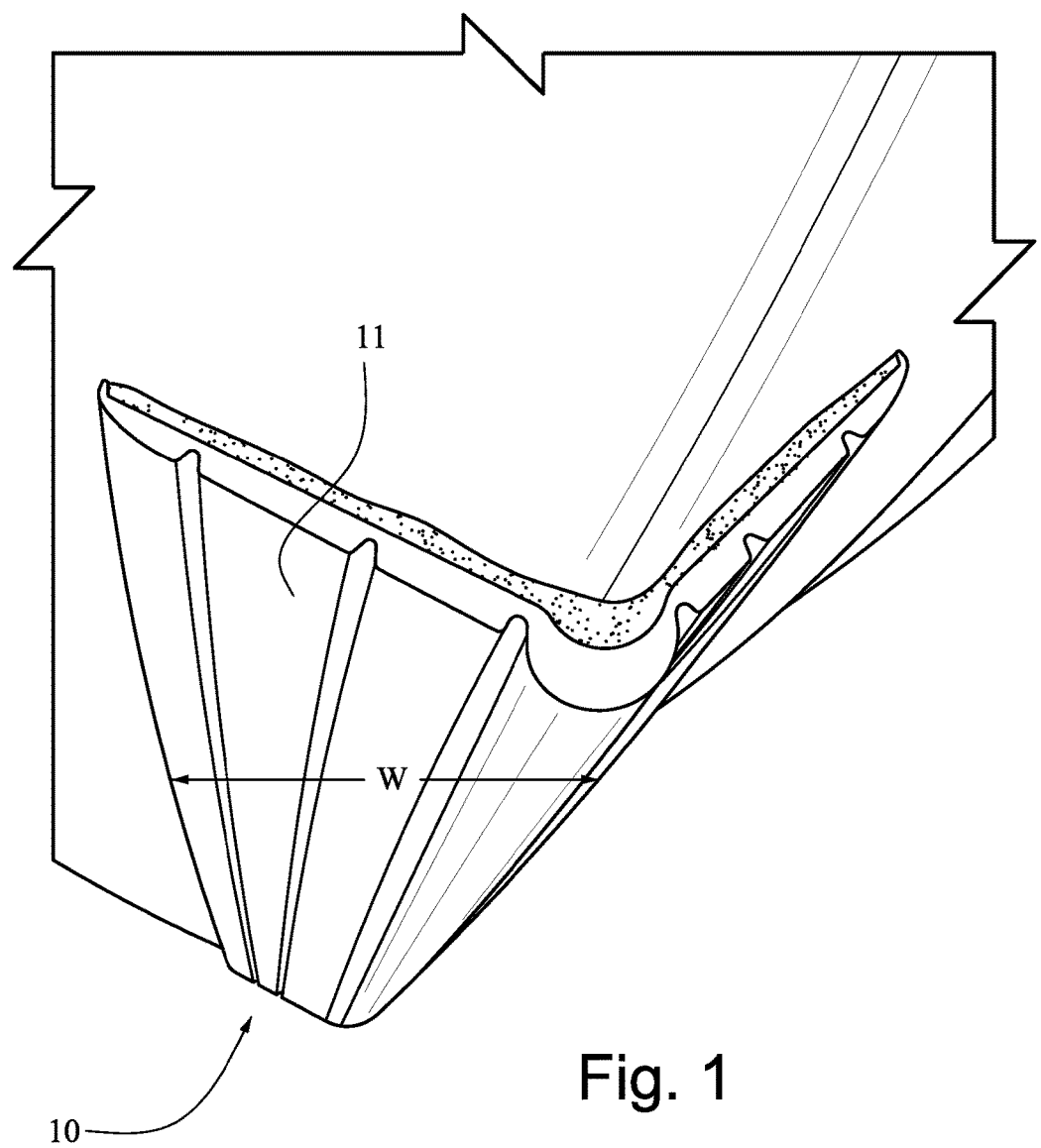

With reference to FIGS. 1-3, a keel guard 10 is generally formed of a strip of polyvinyl chloride (PVC) material 11, either extruded or molded and including a length L, a width W, and a thickness T. The length L of the keel guard 10 is selected to cover the entire portion of a boat keel that may be subjected to damage by impact with a foreign object such as a dock, rocky shore or the like. The length L is thus dependent on the size of the boat. The width W is selected to encompass the boat keel and at least a portion of the boat hull on opposite sides of the keel as shown in FIG. 1. In some embodiments, the width may be 4-8 inches, preferably about five (5) inches. The thickness of the strip 11 may range between 0.1-0.3 inches.

As shown in FIG. 3, in some embodiments, the keel guard 10 is provided with an adhesive layer 12 on a keel side of the strip 11. A removable liner 14 may be positioned over the adhesive layer 12. The strip 11 is also provided with an alignment section 16 along the length of the strip 11. The PVC material of the keel guard 10 is preferably clear or near-clear or otherwise selected such that the alignment section 16 is visible through the PVC material. That is, the alignment section 16 may be formed on the keel side of the strip 11, and the alignment section 16 may be visible through the strip 11 from the opposite side of the strip 11. The keel itself may also be visible through the strip 11 to facilitate installation.

In some embodiments, the alignment section 16 includes an alignment groove 18 formed in the PVC material. The alignment groove 18 defines a bump-out protrusion 19 on an exterior side of the strip that protrudes outward relative to side sections of the strip. The alignment groove 18 is sized and/or shaped to engage the boat keel. A width of the alignment groove 18 may be 0.75-1.0 inches, and a depth of the alignment groove 18 may be 0.1-0.6 inches. The alignment groove 18 may be disposed along a central longitudinal axis of the strip length L. That is, the groove 18 may be disposed in the center relative to the width W of the strip 11 and extend down the strip 11 along its length L.

The strip may also be provided with flex grooves 20 similarly oriented along the length L of the strip. As shown in FIG. 3, the keel guard 10 may include at least two of the flex grooves in the form of flanking grooves 21 on opposite sides of the bump-out protrusion 19. The flex grooves 20 including the flanking grooves 21 help the keel guard 10 bend to match the shape of the boat hull, making it easier to apply and achieve good contact between the hull and the adhesive 12.

To install the keel guard 10, the installer should first properly clean and prep the boat hull and keel. The adhesive liner 14 can be removed to expose the adhesive layer 12 on the strip. The installer then aligns the strip of PVC material 11 by looking through the strip 11 such that the alignment section 16 is aligned with the boat keel. Subsequently, the alignment section 16, such as the alignment groove 18, may be applied to the boat keel. The installer may then press the keel guard 10 on both sides of the alignment section 16 into engagement with the boat hull, working down the length of the keel, one section at a time, applying firm pressure to adhere the guard 10 to the hull.

The alignment section along with the ability to see through the guard during installation makes the application/installation of the keel guard much easier than with existing products. By being able to see the alignment section and/or the keel through the product, it is easier to align the keel guard perfectly on the center of the boat keel and to maintain the desired straightness along the entire installed length. The installer may then remove air bubbles from between the keel guard and the boat hull by looking through the strip and applying pressure to the strip where the air bubbles are observed, resulting in a stronger and more uniform bond.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A keel guard comprising:
a strip of polyvinyl chloride (PVC) material, the strip of PVC material including a length and a width;
an adhesive layer on a keel side of the strip of PVC material; and
a removable liner positioned over the adhesive layer, wherein the strip of PVC material comprises an alignment section along the length of the strip of PVC material and side sections on opposite sides of the alignment section, the alignment section being visible through the strip of PVC material, wherein the alignment section comprises an alignment groove formed in the strip of PVC material, the alignment groove being shaped to engage a boat keel, wherein the strip of PVC material further comprises a bump-out protrusion on a side of the strip of PVC material opposite from the keel side of the strip of PVC material that protrudes outward relative to the side sections, and flanking grooves on opposite exterior sides of the bump-out protrusion.

2. A keel guard according to claim 1, wherein a groove width of the alignment groove is 0.75-1.0 inches, and wherein a groove depth of the alignment groove is 0.1-0.6 inches.

3. A keel guard according to claim 1, wherein the alignment section is disposed along a central longitudinal axis of the length of the strip of PVC material.

4. A keel guard according to claim 1, further comprising flex grooves along the length of the strip of PVC material.

5. A keel guard according to claim 4, comprising at least two of the flex grooves on each side of the alignment groove.

6. A keel guard according to claim 1, wherein the width of the strip of PVC material is 4-8 inches, and wherein a thickness of the strip of PVC material is 0.1-0.25 inches.

7. A keel guard according to claim 1, wherein the strip of PVC material is clear.

8. A guard strip for a boat keel comprising a strip of molded or extruded polyvinyl chloride (PVC) material have a length, a width, and a thickness, the strip of PVC material including an alignment section centrally positioned relative to the width of the strip of PVC material and extending along the length of the strip of PVC material and side sections on opposite sides of the alignment section, wherein the alignment section is visible through the strip of PVC material, and wherein the alignment section comprises an alignment groove formed in the strip of PVC material, the alignment groove being shaped to engage the boat keel, wherein the strip of PVC material further comprises a bump-out protrusion on an exterior side of the strip of PVC material that protrudes outward relative to the side sections, and flanking grooves on opposite exterior sides of the bump-out protrusion.

9. A guard strip according to claim 8, further comprising flex grooves along the length of the strip of PVC material.

10. A guard strip according to claim 9, comprising at least two of the flex grooves on each side of the alignment groove.

11. A guard strip according to claim 8, further comprising:
an adhesive layer on a keel side of the strip of PVC material; and
a removable liner positioned over the adhesive layer.

* * * * *